(12) United States Patent
Eble et al.

(10) Patent No.: US 9,874,473 B2
(45) Date of Patent: Jan. 23, 2018

(54) OPTOELECTRONIC SENSOR

(71) Applicant: SICK AG, Waldkirch (DE)

(72) Inventors: Johannes Eble, Waldkirch (DE); Helmut Haringer, Waldkirch (DE)

(73) Assignee: SICK AG, Waldkirch (DE)

( * ) Notice: Subject to any disclaimer, the term of this patent is extended or adjusted under 35 U.S.C. 154(b) by 15 days.

(21) Appl. No.: 15/153,893

(22) Filed: May 13, 2016

(65) Prior Publication Data
US 2016/0341599 A1 Nov. 24, 2016

(30) Foreign Application Priority Data

May 20, 2015 (DE) .................... 20 2015 102596 U

(51) Int. Cl.
| | |
|---|---|
| *H01J 40/14* | (2006.01) |
| *G01J 1/02* | (2006.01) |
| *G01V 8/20* | (2006.01) |
| *G01J 1/04* | (2006.01) |
| *G01J 1/44* | (2006.01) |
| *G01V 8/10* | (2006.01) |

(52) U.S. Cl.
CPC ............ *G01J 1/0214* (2013.01); *G01J 1/0403* (2013.01); *G01J 1/44* (2013.01); *G01V 8/10* (2013.01); *G01V 8/20* (2013.01)

(58) Field of Classification Search
CPC .................................. G01V 8/20; G01J 1/0271
USPC .................................................. 250/221, 239
See application file for complete search history.

(56) References Cited

U.S. PATENT DOCUMENTS

| | | | |
|---|---|---|---|
| 5,003,169 A | 3/1991 | Sakaguchi et al. | |
| 9,304,034 B2* | 4/2016 | Ishikawa | ................ G01V 8/20 |
| 2001/0025918 A1 | 10/2001 | Shteynberg et al. | |
| 2004/0159778 A1 | 8/2004 | Sakaguchi | |

FOREIGN PATENT DOCUMENTS

| | | |
|---|---|---|
| DE | 102004012794 A1 | 11/2005 |
| EP | 2730952 A1 | 5/2014 |

OTHER PUBLICATIONS

German Search Report dated Jan. 11, 2016 corresponding to German application No. 202015102596.3.

* cited by examiner

*Primary Examiner* — Kevin Pyo
(74) *Attorney, Agent, or Firm* — Nath, Goldberg & Meyer; Jerald I. Meyer; Annie J. Kock

(57) ABSTRACT

To allow a simple cascading without any optical crosstalk at the connection points, an optoelectronic sensor is provided having at least one electronic card which has light transmitter elements and/or light reception elements and having at least two optical modules which can be fastened to the electronic card, wherein each optical module comprises a tube array, which has a plurality of tubes, an open end and a closed end, wherein the open end of the optical module comprises an open first connection element of a connection to the tube array and comprises wall connection elements and wherein the closed end of the optical module comprises a closed second connection element of the connection which has an outer wall which is formed with shape matching to the wall connection elements of the open end of the optical module such that, on a plugging together of an open end of an optical module and of a closed end of a further optical module, the two connection elements of the connection form a connection tube which is like the tubes of the tube array.

11 Claims, 3 Drawing Sheets

OPTOELECTRONIC SENSOR

Figure 1:
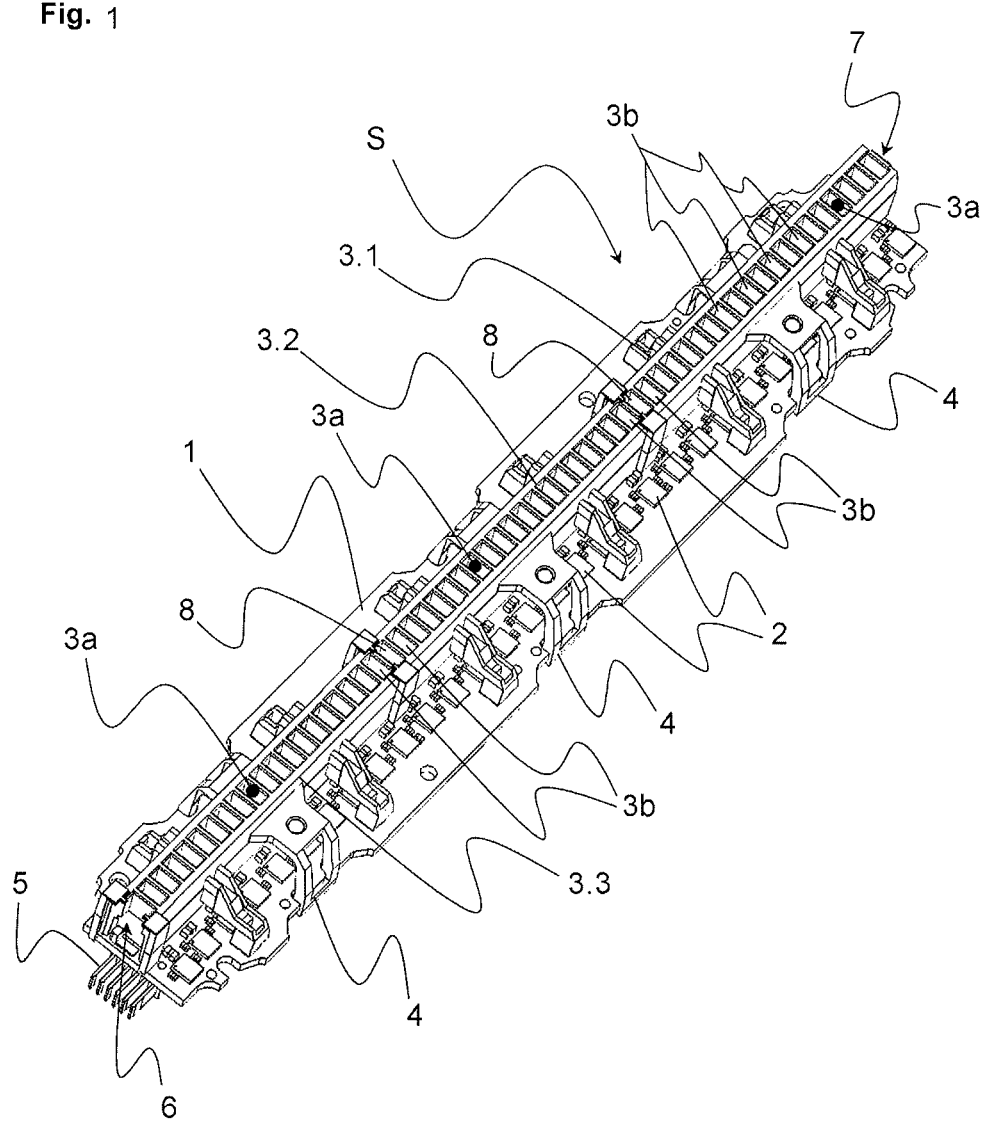

The invention relates to an optoelectronic sensor having at least one electronic card which has light transmitter elements and/or light reception elements and having at least two optical modules which can be fastened to the electronic card.

Optoelectronic sensors are used in the automation industry to monitor a working environment of a hazardous machine or the access to the working environment of the hazardous machine or generally to detect an object.

Optoelectronic sensors include, for example, light barriers which work according to the principle of transmitting a light beam using the light transmitter elements, of registering it in the light reception elements and of evaluating whether the received signal exceeds/does not reach a switching threshold or not. A plurality of light barriers are effectively joined together in parallel with one another in such a light grid so that a defined zone is illuminated by the light barriers. It is known to design light grids as modules so that a cascading of light grids is desired to allow a larger defined monitored zone.

In the cascading, a plurality of light grids are connected to one another, wherein a plurality of electronic cards having light transmitter elements and/or light reception elements can be connected to one another. A high resolution of the light grids is aimed for in this respect, with a pattern of the light grids becoming smaller. The light transmitter elements and/or the light reception elements and in particular the spacings between the light transmitter elements and/or the light reception elements thereby become smaller.

To minimize mutual influencing of the light beams of the light transmitter elements or to minimize reflection effects which reduce the measurement accuracy of the light grids and to allow simultaneous scanning, i.e. a plurality of light transmitter elements and/or light reception elements are active simultaneously, an irradiation angle or reception angle for each light transmitter element and light reception element respectively has to be limited. I.e. the irradiation angle of each light transmitter element or the reception angle of each light reception element is limited by so-called channels. This is typically ensured with light grids using optical modules. Each optical module has at least one tube array, with the tubes of the tube array forming the channels.

The tubes of the tube array of the optical modules thus prevent optical crosstalk between the light transmitter elements and/or the light reception elements.

It is therefore the object of the present invention to improve an optoelectronic sensor such that a cascading can be achieved simply and without optical crosstalk at the connection points.

The object is satisfied in accordance with the invention by an optoelectronic sensor having at least one electronic card which has light transmitter elements and/or light reception elements and having at least two optical modules which can be fastened to the electronic card, wherein each optical module comprises a tube array, which has a plurality of tubes, an open end and a closed end, wherein the open end of the optical module comprises an open first connection element of a connection to the tube array and comprises wall connection elements and wherein the closed end of the optical module comprises a closed second connection element of the connection which has an outer wall which is formed with shape matching to the wall connection elements of the open end of the optical module such that, on a plugging together of an open end of an optical module and of a closed end of a further optical module, the two connection elements of the connection form a connection tube which is like the tubes of the tube array.

In accordance with a preferred embodiment, the open first connection element comprises three side walls of the connection tube and is open towards the end of the optical module.

In accordance with a further preferred embodiment, the outer wall of the closed second connection element forms a fourth side wall of the connection tube when the first and second connection elements are plugged into one another.

In accordance with a further preferred embodiment, the wall connection elements are arranged at oppositely disposed connection walls of the open first connection element.

In accordance with a further preferred embodiment, the wall connection elements form a C shape with the open first connection element. The advantage results from this that the wall connection elements optically shield the formed connection tube in the plugged-together state of the first and second connection elements of the connection. I.e. no light can exit or enter through the gaps between the side walls of the first and second connection elements.

In accordance with a further preferred embodiment, the wall connection elements are open at the side directed towards the electronic card so that the open first connection element can be plugged onto the closed second connection element in the direction of the electronic card. The advantage results from this that a precise plugging together of the optical modules is possible. The assembly of the optoelectronic sensor is furthermore facilitated so that production costs can be reduced.

In accordance with a further preferred embodiment, the wall connection elements are closed by means of wall elements at the side remote from the electronic card. The connection tube is hereby also advantageously optically shielded in the direction of an optical axis of the optoelectronic sensor.

In accordance with a further preferred embodiment, the wall connection elements each have a groove into which the closed second connection element can be pushed. The advantage results that an exact guidance of the modules is present on the assembly of the optical modules.

In accordance with a further preferred embodiment, the groove is provided at an inner side of the respective wall connection element so that the grooves are arranged opposite.

In accordance with a further preferred embodiment, the connection tube has the same geometry and wall surface property as the tubes of the tube array. The connection tube hereby advantageously has the same optical properties as the tubes of the optical modules.

In accordance with a further preferred embodiment, the wall connection elements comprise latching elements for latching the optical modules to one another.

The optoelectronic sensor in accordance with the invention can be designed in a similar manner by further features and shows similar advantages in this respect.

Such further features are described by way of example, but not exclusively, in the dependent claims following the independent claims.

Figure 2A:
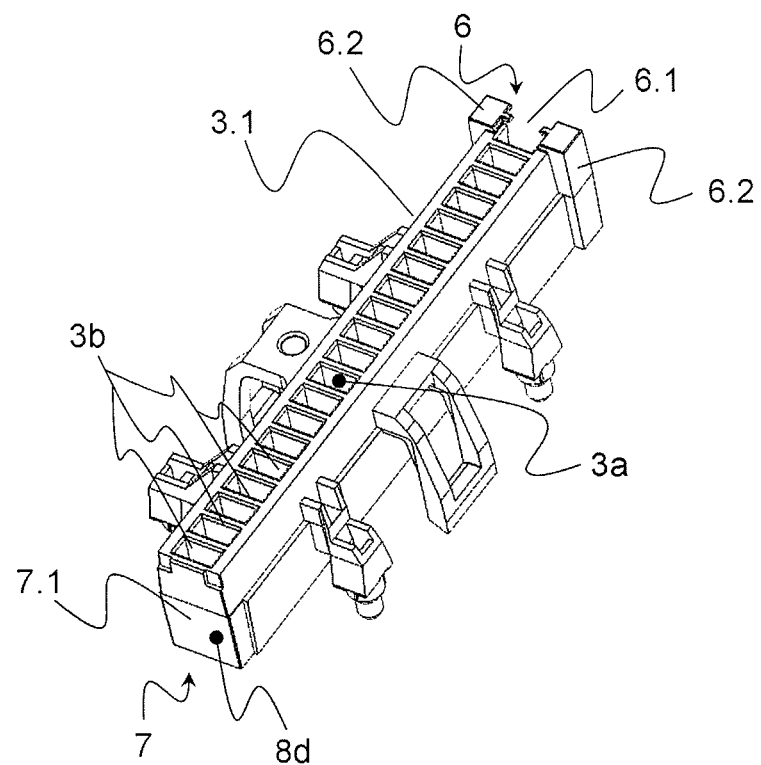
Figure 2B:
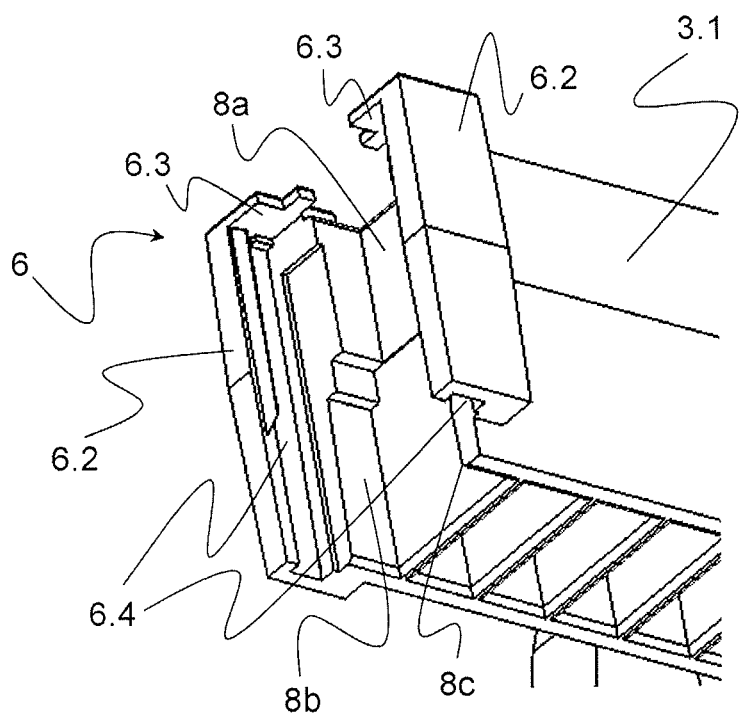
Figure 2C:
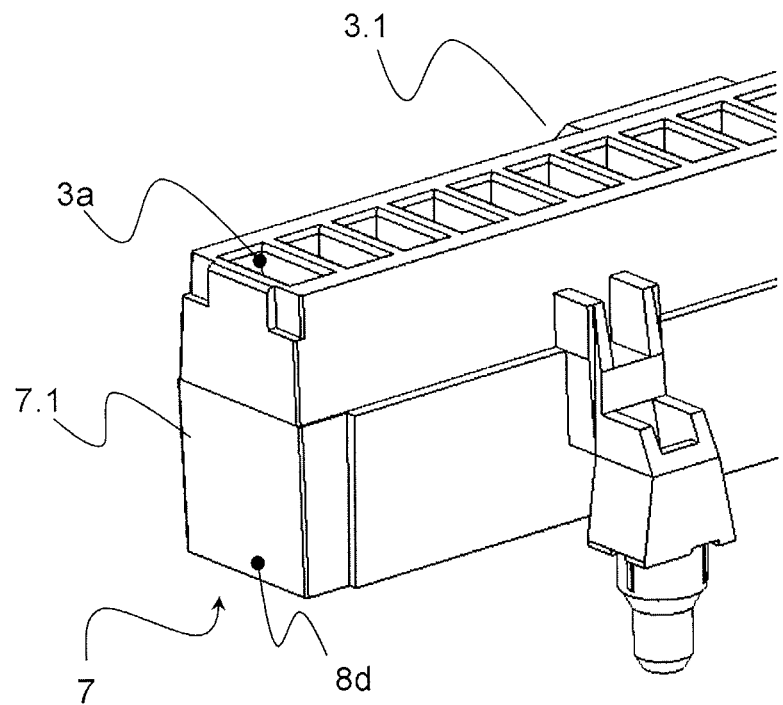

The invention will also be explained in the following with respect to further advantages and features with reference to the enclosed drawing and to embodiments. The Figures of the drawing show in:

FIG. 1 a schematic 3D representation of an optoelectronic sensor in accordance with the invention without an outer housing;

FIG. 2A a schematic 3D representation of an optical module in accordance with the invention;

FIG. 2B a schematic detailed 3D representation of an open end of the optical module in accordance with the invention; and FIG. 2C a schematic detailed 3D representation of a closed end of the optical module in accordance with the invention.

A schematic 3D representation of an optoelectronic sensor S in accordance with the invention is shown in FIG. 1, with the outer housing of the optoelectronic sensor S in accordance with the invention being omitted.

The optoelectronic sensor S in accordance with the invention has at least one electronic card 1 on which the electronic elements 2 of the optoelectronic sensor S in accordance with the invention are plugged. Furthermore, light transmitter elements and/or light reception elements of the optoelectronic sensor S in accordance with the invention are plugged onto the electronic card 1 and are covered by optical modules 3.1, 3.2, 3.3 in the shown FIG. 1.

The shown preferred embodiment of the optoelectronic sensor S in accordance with the invention has a single electronic card 1 and three optical modules 3.1, 3.2, 3.3, with the three optical modules 3.1, 3.2, 3.3 being locked to the electronic card 1 by means of holding hoops 4. The electronic card 1 has a plug 5 with which the electronic card 1 can be electrically connected to further electronic cards, not shown, so that a cascading of the optoelectronic sensor S in accordance with the invention would be possible.

The shown optical modules 3.1, 3.2, 3.3 each comprise a tube array 3a which has a plurality of tubes 3b, 19 tubes 3b in the shown preferred embodiment. Each optical module 3.1, 3.2, 3.3 comprises an open end 6 and a closed end 7.

The open end 6 of the third optical module 3.3 and the closed end 7 of the first optical module 3.1 can be seen from the shown FIG. 1.

Furthermore, two connection tubes 8 are shown which will be explained in more detail in the following and which are each arranged between two optical modules 3.1, 3.2, 3.3 in accordance with the invention.

A single optical module 3.1 in accordance with the invention is shown schematically in 3D in FIG. 2A. The optical module 3.1 in accordance with the invention comprises the tube array 3a having the exemplary 19 tubes 3b, the open end 6 and the closed end 7. The open end 6 of the optical module 3.1 in accordance with the invention comprises an open first connection element 6.1 of a connection of the tube array 3a. The open end 6 of the optical module 3.1 in accordance with the invention furthermore comprises wall connection elements 6.2 which with the open first connection element 6.1 preferably form a C shape at the open end 6 of the optical module 3.1 in accordance with the invention.

The closed end 7 of the optical module 3.1 in accordance with the invention comprises a closed second connection element 7.1 of the connection, with the closed second connection element 7.1 having an outer wall 8d.

In accordance with the invention, the outer wall of the closed second connection element 7.1 is configured with shape matching to the wall connection elements 6.2 of the open end 6 of the optical module being 3.1 in accordance with the invention such that, on a plugging together of an open end 6 of an optical module in accordance with the invention, for example of the module 3.1 in FIG. 1, and of a closed end 7 of an optical module in accordance with the invention, for example of the module 3.1 in FIG. 1, the two connection elements 6.1 and 7.1 of the connection form a connection tube 8 shown in FIG. 1, with the connection tube 8 being like the 19 tubes 3b of the tube array 3a.

I.e. in other words, if an optical module 3.1 or 3.2 in accordance with the invention is plugged together with a further optical module 3.2 or 3.3 in accordance with the invention to allow a cascading, the open end 6 of the one optical module 3.1 or 3.2 in accordance with the invention and the closed end 7 of the other optical module 3.2 or 3.3 in accordance with the invention form the connection tube 8 which can act as a tube for a light transmitter element or light reception element of the electronic card 1 located at the connection point. In this respect, the connection tube 8 has identical geometries and optical properties to the other 19 tubes 3b of the tube array 3a of the optical modules 3.1, 3.2, 3.3 in accordance with the invention.

A detailed 3D representation of the open end 6 or of the open first connection element 6.1 of the optical module 3.1 in accordance with the invention is shown in FIG. 2B. In this respect, the open first connection element 6.1 comprises three side walls 9a, 9b, 9c of the connection element 8 and is open towards the end of the optical module 3.1 in accordance with the invention. The three side walls comprise a wide separating wall 8a which separates the first open connection element 6.1 from the inwardly disposed tube 3b of the tube array 3a and two connection walls 8b and 8c narrower in comparison with the wide separating wall 8a.

A respective wall connection element 6.2 is arranged at the connection walls 8b and 8c so that the wall connection elements 6.2, the connection walls 8b and 8c and the separating wall 8a together represent the mentioned C shape.

The wall connection elements 6.2 are open at the side directed towards the electronic card 1 so that, when an optical module 3.3 in accordance with the invention is already plugged onto the electronic card 1, the first open connection element 6.1 of the further optical module 3.2 in accordance with the invention can simply be plugged onto the second closed connection element 7.1 of the already plugged optical module 3.3 in accordance with the invention in the direction of the electronic card 1.

The wall connection elements 6.3 are closed by means of wall elements 6.3 at the side remote from the electronic card 1. The wall elements 6.3, on the one hand, serve as an abutment on the plugging together of the optical modules 3.1, 3.2, 3.3 in accordance with the invention and, on the other hand, as an optical shield for the formed connection tube 8 in operation. No interfering light from/in the connection tube 8 on/from the adjacent tube 3b of the plugged-in optical module in accordance with the invention can thereby crosstalk.

To facilitate the plugging together of the two connection elements 6.1 and 7.1 of the connection, the wall connection elements 6.2 each have a groove 6.4, the grooves being provided at an inner side of the wall connection elements 6.2 and being closed at one end by the wall elements 6.3 so that the grooves 6.4 are arranged opposite and the second closed connection element 7.1 can be pushed into the grooves 6.4.

The grooves 6.4 guide the second closed connection element 7.1 on the plugging together of the optical modules 3.1, 3.2, 3.3 in accordance with the invention, whereby a precise plugging together is additionally made possible.

As is shown in FIG. 2C, which represents a detailed 3D representation of the closed end 7, in particular of the second closed connection element 7.1, of the optical module 3.1 in accordance with the invention, the second closed connection element 7.1 forms the outer wall 8d of the last tube 3b of the optical module 3.1 in accordance with the invention. In this respect, the outer wall 8d is shape matched to the wall connection elements 6.2 of the first open connection element 6.1. In addition, the geometrical dimensions of the outer wall 8d are designed such that, in a plugged-together state of the outer wall 8d in the grooves 6.4 of the wall connection elements 6.2, i.e. the mounted state of the first open connection element 6.1 with the second closed connection element 7.1, the connection tube 8 is formed with identical geometrical dimensions to the other tubes 3b of the optical module 3.1, 3.2, 3.3 in accordance with the invention.

Furthermore, the geometries and surfaces of the inner surfaces of the first open and second closed connection elements 6.1 and 7.1, i.e. of the separating wall 8a, of the connection walls 8b and 8c, and of the outer wall 8d, are formed such that the formed connection tube 8 has the same optical properties as the other tubes 3b of the optical module 3.1, 3.2, 3.3 in accordance with the invention. In this respect, in the region of the light guidance, the tubes 3b can be matte, can have a rib structure or can be provided with a light-absorbing layer so that the interference signal suppression can be improved.

In addition, the wall connection elements 6.2 of the open end 6 of the optical module 3.1, 3.2, 3.3 in accordance with the invention comprise latching elements which lock the optical modules 3.1, 3.2, 3.3 in accordance with the invention to one another. The latching elements can be latching hooks, for example. The optical modules 3.1, 3.2, 3.3 in accordance with the invention hereby have a high stability in the plugged-together state so that the electronic cards 1, on which the plugged together optical modules 3.1, 3.2, 3.3 in accordance with the invention are mounted, can likewise be mounted in a stable manner and precisely with respect to one another. Additional holding means or plastic connector means for aligning and holding adjacent electronic cards 1 can be dispensed with accordingly.

REFERENCE NUMERAL LIST

1 electronic card
2 electronic elements
3.1, 3.2,3.3 optical modules
3a tube array
3b tube/tubes
4 holding hoops
5 plug
6 open end of the optical module
6.1 open first connection element
6.2 wall connection element
6.3 wall element
6.4 groove
7 closed end of the optical module
7.1 closed second connection element
8 connection tube
8a separating wall
8b, 8c connection wall
8d outer wall
S optoelectronic sensor

The invention claimed is:

1. An optoelectronic sensor having at least one electronic card, with the electronic card comprising light transmitter elements and/or light reception elements, and having at least two optical modules which can be fastened to the electronic card,
    wherein each optical module comprises a tube array having a plurality of tubes, the optical module further comprising an open end and a closed end; and
    wherein the open end of the optical module comprises an open first connection element of a connection of the tube array and comprises wall connection elements and the closed end of the optical module comprises a closed second connection element of the connection which has an outer wall which is configured with shape matching to the wall connection elements of the open end of the optical module such that, on a plugging together of an open end of an optical module and of a closed end of a further optical module, the two connection elements of the connection form a connection tube which is like the tubes of the tube array.

2. The optoelectronic sensor in accordance with claim 1, wherein the open first connection element comprises three side walls of the connection tube and is open towards the end of the optical module.

3. The optoelectronic sensor in accordance with claim 1, wherein the outer wall of the closed second connection element forms a fourth side wall of the connection tube when the first and second connections elements are plugged into one another.

4. The optoelectronic sensor in accordance with claim 1, wherein the wall connection elements are arranged at oppositely disposed connection walls of the open first connection element.

5. The optoelectronic sensor in accordance with claim 1, wherein the wall connection elements form a C shape with the open first connection element.

6. The optoelectronic sensor in accordance with claim 1, wherein the wall connection elements are open at the side directed to the electronic card such that the open first connection element can be plugged onto the closed second connection element in the direction of the electronic card.

7. The optoelectronic sensor in accordance with claim 1, wherein the wall connection elements are closed by means of wall elements at the side remote from the electronic card.

8. The optoelectronic sensor in accordance with claim 1, wherein the wall connection elements each have a groove into which the closed second connection element can be pushed.

9. The optoelectronic sensor in accordance with claim 8, wherein the groove is provided at an inner side of the respective wall connection element so that the grooves are arranged opposite.

10. The optoelectronic sensor in accordance with claim 1, wherein the connection tube has the same geometry and wall surface property as the tubes of the tube array.

11. The optoelectronic sensor in accordance with claim 1, wherein the wall connection elements comprise latching elements for latching the optical modules to one another.

* * * * *